United States Patent [19]

Arai et al.

[11] Patent Number: 5,407,239
[45] Date of Patent: Apr. 18, 1995

[54] VEHICLE BUMPER BEAM AND METHOD OF FABRICATING THE SAME

[75] Inventors: Takeo Arai; Yasuo Muraoka; Fumiaki Fukuchi, all of Saitama, Japan

[73] Assignee: Honda Giken Kogyo Kabushiki Kaisha, Tokyo, Japan

[21] Appl. No.: 980,689

[22] Filed: Nov. 24, 1992

[30] Foreign Application Priority Data

Nov. 25, 1991 [JP] Japan .................... 3-335757

[51] Int. Cl.⁶ ........................... B60R 19/12
[52] U.S. Cl. .................... 293/146; 293/102; 293/155
[58] Field of Search ............. 293/102, 146, 120, 155, 293/1, 142, 143

[56] References Cited

U.S. PATENT DOCUMENTS

| D. 173,050 | 2/1954 | Brannberger | 293/146 X |
| 1,404,517 | 1/1922 | French | 293/143 |
| 3,865,358 | 2/1975 | Butters | 293/102 X |
| 3,997,208 | 12/1976 | Nomiyama | 293/142 |
| 4,095,831 | 6/1978 | Hagiwara et al. | 293/155 X |
| 5,031,947 | 7/1991 | Chen | 293/146 X |

FOREIGN PATENT DOCUMENTS

| 211942 | 12/1983 | Japan | 293/102 |
| 610155 | 10/1948 | United Kingdom | 293/120 |

Primary Examiner—David M. Mitchell
Assistant Examiner—Gary C. Hoge
Attorney, Agent, or Firm—Armstrong, Westerman, Hattori, McLeland & Naughton

[57] ABSTRACT

A bumper beam for a vehicle bumper, having a base beam preferably made of an extruded aluminum alloy, and an impact beam attached to an outer surface of the base beam with these members joined together by sliding engagement in an axial direction of the base beam. The bumper beam and the impact beam can be made of straight linear members each having a relatively small cross sectional area. In particular, the base beam may have a pair of vertically spaced identical members extending in a mutually parallel relationship which are joined together by the impact beam.

14 Claims, 2 Drawing Sheets

VEHICLE BUMPER BEAM AND METHOD OF FABRICATING THE SAME

TECHNICAL FIELD

The present invention relates to a bumper beam for a bumper of a vehicle, and in particular to a bumper beam made of such materials as aluminium alloys and a method of fabricating the same.

BACKGROUND OF THE INVENTION

Conventionally, a bumper for a motor vehicle is provided with a bumper beam as a structural element which ensures the necessary mechanical strength and rigidity of the bumper. Typically, the bumper beam is covered by a bumper exterior which conforms with the exterior finish of the vehicle body. As a part of an effort to reduce the weight of the vehicle, it has been proposed to use high strength aluminum alloys for bumper beams. Such a bumper beam can be fabricated by extruding a 6000 or 7000 series aluminum alloy into a channel member having a box-shaped cross section, and bending and machining the member into a desired shape. Thereafter, it is necessary to anneal it or otherwise thermally process it so that the bumper beam may have desired mechanical properties.

However, an extruded bumper beam member cannot be easily bent into a desired shape because it has a box-shaped cross section having a large moment of inertia, and is highly resistant bending deformation. In addition to this difficulty, fabricating a bumper beam out of an aluminum alloy involves other difficulties. An extruded aluminum member having a relatively large cross sectional area and a box-shaped cross section cannot be freely bent into a desired shape which the vehicle exterior design dictates without any ordinary means, and a desired dimensional precision cannot be easily achieved. Also, such an extruded aluminum member is not suitable for heat treatment.

Further, the use of a relatively high-strength aluminum significantly reduces the service life of the extrusion die, and this impairs the production efficiency of the bumper. Further, different extrusion dies are needed for different vehicle models to which the bumper are to be used, and the need for stocking a large number of extrusion dies also impairs the production efficiency of the bumper.

BRIEF SUMMARY OF THE INVENTION

In view of such problems of the prior art, a primary object of the present invention is to provide a bumper beam which can be relatively easily formed into a desired shape.

A second object of the present invention is to provide a bumper beam which can be efficiently fabricated.

A third object of the present invention is to provide a bumper beam which can be fabricated with high precision.

These and other objects of the present invention can be accomplished by providing a bumper beam for a vehicle bumper, comprising: a base beam having a certain length and adapted to be mounted on a vehicle body with an inner surface of the base beam facing the vehicle body; an impact beam attached to an outer surface of the base beam for absorbing an impact in case of a vehicle crash; first engagement means provided on the base beam; and second engagement means provided on the impact beam in such a manner that the impact beam may be joined with the base beam by sliding engagement of the first and second engagement means in an axial direction of the base beam.

Thus, the bumper beam and the impact beam can be made of straight linear members each having a relatively small cross sectional area so that the beams can be made of any material which would be difficulty to be formed into a desired shape if the bumper beam were to be made of an integral single member. Preferably, the base beam comprises a pair of vertically spaced identical members extending in a mutually parallel relationship which are preferably joined together by the impact beam. Thus, a large number of different bumper beams can be made as different combinations of limited number of different base beams and impact beams.

In particular, the impact beam and the bumper beam can be made of extruded light-weight aluminum alloy members. For instance, the base beam may be made of an aluminum alloy having a relatively high mechanical strength while the impact beam may be made of a material capable of favorably absorbing the energy of an impact in case of a vehicle crash.

According to a preferred embodiment, the first engagement means of the base beam can be used for securing stay members thereto for mounting the base beam to the vehicle body so that the design and the fabrication of the base beam may be simplified.

If desired, the impact beam may consist of a plurality of blocks each having a relatively small length so that the impact block may be capable of readily conforming to a curved shape and/or different lengths of the base beam.

The bumper beam of the present invention can be fabricated by a method comprising the steps of: forming a base beam which is to be mounted on a vehicle body as a linear member; forming an impact beam which is to be secured to the base beam for absorbing an impact of a vehicle crash as a linear member; joining the base beam and the impact beam with each other by sliding engagement in an axial direction via engagement means provided between the impact beam and the base beam. If necessary, the two axial ends of the base beam may be bent into a desired shape after mounting the impact beam thereon.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
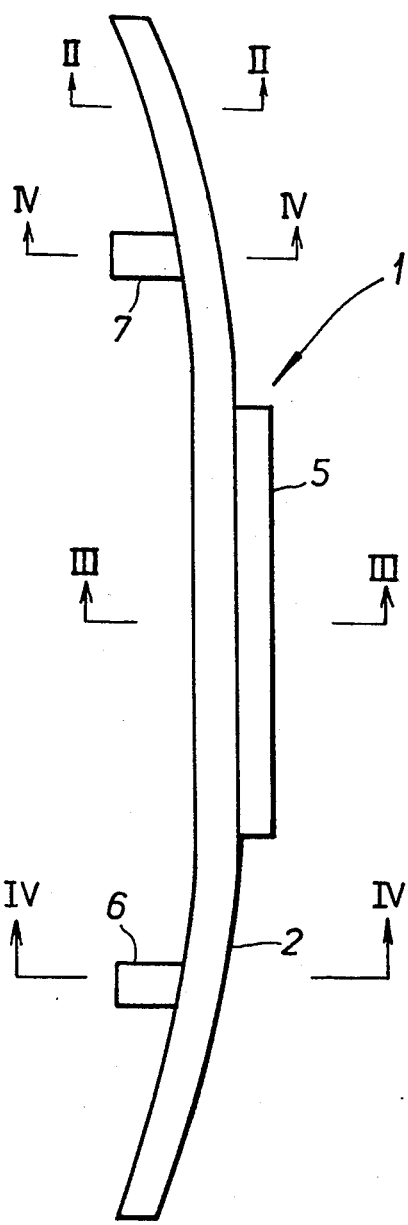
FIG. 1 is a simplified plan view of a first embodiment of the vehicle bumper beam according to the present invention.

Referring to FIGS. 1 through 4 showing a first embodiment of the present invention, the bumper beam 1 according to the present invention comprises a base beam 2 consisting of two parts 3 and 4 which extend laterally over the entire length of the bumper beam 1 in a mutually parallel relationship one above the other, an impact beam 5 attached to a central part of the base beam 2 and projecting from an outer surface of the base beam 2 facing away from a vehicle body not shown in the drawings, and a pair of stays 6 and 7 for securing the base beam 2, at two laterally spaced positions thereof, to the vehicle body with an inner surface of the base beam 2 facing the vehicle body.

Figure 2:
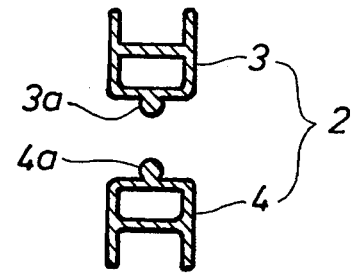
FIGS. 2 through 4 are sectional views taken along lines II—II, III—III and IV—IV, respectively.

As best shown in FIG. 2, the two parts 3 and 4 of the base beam 2 are disposed in a symmetric relationship or so as to be mirror images of each other, each part having an A-shaped cross section. The mutually opposing surfaces of these two parts 3 and 4 are each provided with a first engagement means such as a ridge 3a or 4a extending along the length of the corresponding part and having a substantially circular cross section.

Figure 3:
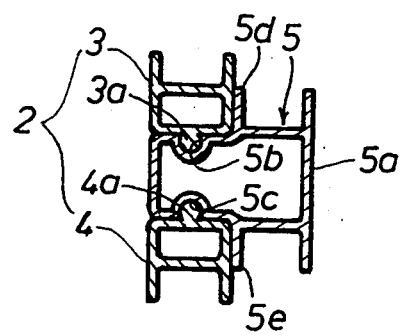

As best shown in FIG. 3, the impact beam 5 has a substantially rectangular hollow cross section, and is provided with vertical flanges along upper and lower edges of its outer surface 5a. The upper and lower surfaces of the impact beam 5 are provided with a second engagement means such as grooves 5b and 5c extending along the length of the impact beam 5 for sliding engagement with the ridges 3a and 4a of the two parts of the base beam 2, and vertical flanges 5d and 5e which abut the outer surfaces of the two parts 3 and 4 of the base beam 2, respectively, at positions of the corresponding parts 3 and 4 of the base beam 2 between the grooves 5b and 5c and the front surface 5a of the impact beam 5.

In this embodiment, the outer opening of each of the grooves 5b and 5c is narrower than the interior of the corresponding groove, and each of the ridges 3a and 4a comprises a portion, which is received in the corresponding groove 5b or 5c, having a width greater than the width of the outer opening of the corresponding groove so that the two parts may be joined integrally together by sliding engagement in the axial direction but can withstand a force which tends to separate the two members vertically away from each other.

Figure 4:
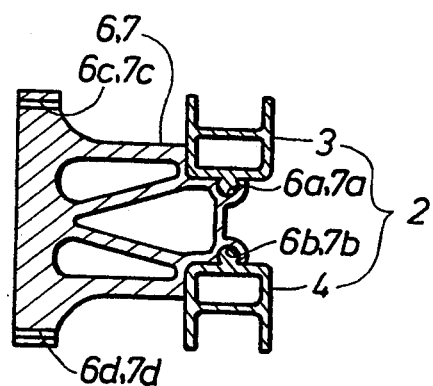

As best shown in FIG. 4, the front end of each of the stays 6 and 7 is provided with grooves 6a and 6b or 7a and 7b which are similar to the grooves 3a and 4a of the two parts 3 and 4 of the base beam 2 for engagement with the ridges 3a and 4a of the two parts 3 and 4 of the base beam 2. The inner end of each of the stays 6 and 7 is provided with mounting holes 6c and 6d or 7c and 7d for passing the bolts for securing the stay 6 and 7 to the vehicle body.

In each of FIGS. 1 through 4, the left hand side corresponding to the side facing the vehicle body is described as the inner side. When the bumper beam is mounted on the front end of the vehicle, the left hand side in these drawings corresponding to a rear side of the bumper beam.

Now the method of fabricating and assembling the bumper beam 1 is described in the following.

Figure 5A:
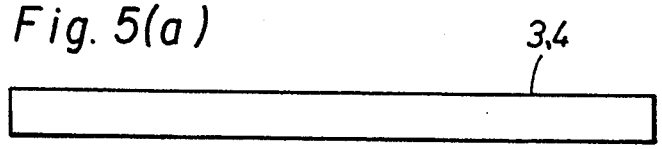
FIGS. 5a to 5d are simplified plan views showing the steps of fabricating and assembling the vehicle bumper beam according to the present invention.

First of all, an aluminum alloy having a relatively high mechanical strength such as a 7000 series aluminum alloy is extruded so as to produce two parts 3 and 4 of a base beam 2 each having the cross section illustrated in FIG. 2 as a pair of straight linear members (FIG. 5a). An aluminum alloy having a comparatively lower mechanical strength but capable of favorably absorbing the impact energy in case of a crash such as a 6000 series aluminum alloy is extruded so as to produce an impact beam 5 having the cross section illustrated in FIG. 3 and a pair of stays 6 and 7. In practice, each of these members are subjected to appropriate heat treatment such as tempering and annealing as required.

The reason for using the 6000 series aluminum alloy for the impact beam 5 is to absorb the energy of the impact of a crash by plastic and other deformation of the impact beam 5, and the reason for using the 6000 series aluminum alloy is its favorable anti-corrosive property.

Figure 5B:
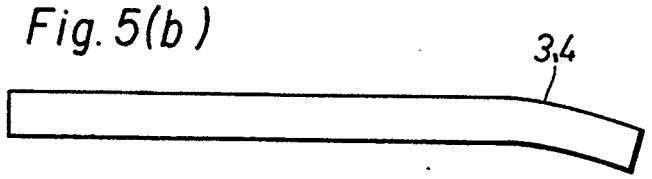
Figure 5C:
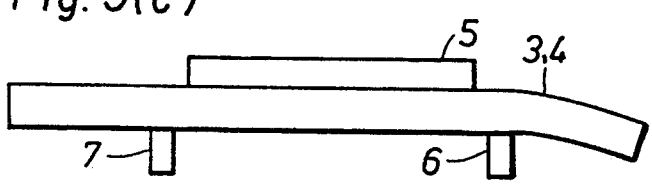

One end of each of the two parts 3 and 4 of the base beam 2 which are linear at this point is bent as illustrated in FIG. 5b, and the stays 6, the impact beam 5 and the stay 7 are assembled to the two parts of the base beam by fitting the ridges 3a and 4a of the two parts into the engagement grooves 6a and 6b of the stay 6, the engagement grooves 5b and 5c of the impact beam 5, and the engagement grooves 7a and 7b of the stay 7 in the axial direction in that order as illustrated in FIG. 5c.

Figure 5D:
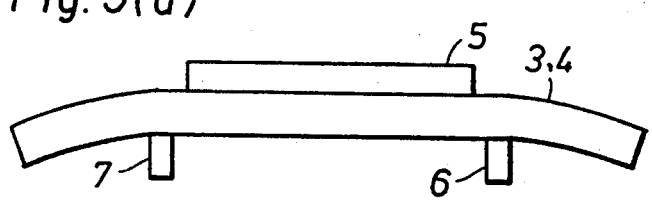

Then, the other end of each of the two parts 3 and 4 is similarly bent, and the bumper beam 1 is completed as illustrated in FIG. 5d.

To ensure the accurate positioning of the various parts of the bumper beam 1, the sliding engagement between grooves 6a, 6b, 7a, 7b, 5b and 5c and the ridges 3a and 3b may be permanently secured by using rivets or the like.

According to the above described embodiment, the bumper beam 1 can be adapted to different vehicle models by appropriately changing the length of the base beam 2, and the configuration of the impact beam 5 so that the vertical spacing of the two parts of the base beam may be changed by changing the height of the impact beam. Impact beams 5 having different shapes may be prepared so that they may be adapted to different external appearance of the vehicle body.

Figure 6:
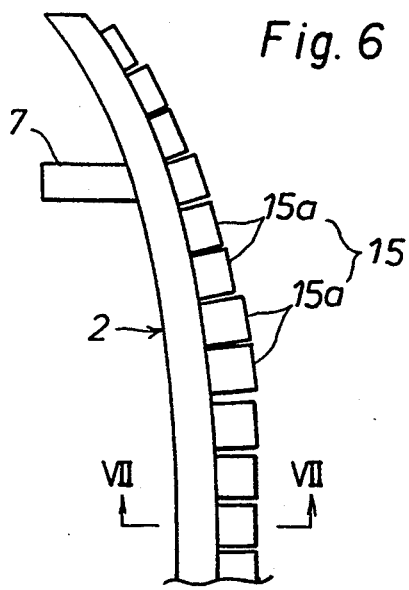
FIG. 6 is a fragmentary plan view of a second embodiment of the vehicle bumper beam according to the present invention.

FIG. 6 shows a second embodiment of the present invention, and the parts corresponding to those of the previous embodiment are denoted with like numerals. This embodiment is different from the previous embodiment primarily in the structure of the impact beam 15 which in this embodiment consists of a multiplicity of short blocks 15a. By using a suitable number of such blocks 15a, it is possible to adapt the impact beam 15 to different shape and dimensions of the bumper. Because the impact beam 15 consists of mutually separated blocks, it may be adapted to different length and shape of the bumper simply by using different number of blocks and/or different combinations of different blocks.

Figure 7:
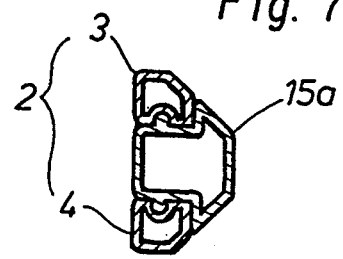
FIG. 7 is a sectional view taken along line VII—VII of FIG. 6.

FIG. 7 is a sectional view taken along line VII—VII of FIG. 6. As can be seen in FIG. 7, two parts 3 and 4 of the base beam 2 are disposed in symmetric relationship or so as to be mirror images of each other. One of the multiplicity of short blocks 15a is shown in cross section.

As described above, according to the bumper beam and the method of fabricating the same of the present invention, the bumper beam can be constructed from a plurality of extruded members each of which has a relatively small cross sectional area. Thus, the base beam and the impact beam may be separately extruded linearly, and they may be joined integrally together by sliding engagement in the axial direction. Therefore, the process of extrusion can be simplified and the service life of the extrusion die can be extended as each of the members to be extruded has a relatively small cross sectional area. The small cross section of each of the members allows it to be freely bent and formed into a desired dimensional precision. Further, the bumper beam can be adapted to different models simply by changing some of the members which make up the bumper beam.

Although the present invention has been described in terms of preferred embodiments thereof, it is obvious to a person skilled in the art that various alterations and modifications are possible without departing from the scope of the present invention which is set forth in the appended claims.

What we claim is:

1. A bumper beam for a vehicle bumber, comprising:
   an upper base beam and a separate lower base beam, each having a certain length and adapted to be mounted on a vehicle body with an inner surface of each of said base beams facing said vehicle body;
   an impact beam attached to an outer surface of each of said base beams for absorbing an impact in case of a vehicle crash;
   first engagement means provided on each of said base beams; and
   second engagement means provided on said impact beam in such a manner that said impact beam may be joined with said base beams by sliding engagement of said first and second engagement means in an axial direction of said base beams;
   wherein said upper base beam and said lower base beam are connected to each other via said impact beam; and
   wherein said first engagement means comprises projections on each of said upper base beam and said lower base beam, and said second engagement means comprises corresponding grooves on opposite surfaces of said impact beam for engaging and interlocking with respective projections on said upper and lower base beams.

2. A bumper beam according to claim 1, wherein said base beams are made of a different material than said impact beam.

3. A bumper beam according to claim 1, wherein said base beam is an extruded aluminum alloy.

4. A bumper beam according to claim 3, wherein said impact beam comprises a plurality of blocks each having a length so that said impact block is capable of conforming to a curved shape and/or different lengths of said base beam.

5. A bumper beam according to claim 3, wherein said base beam is bent at each axial end thereof.

6. A bumper beam according to claim 3, wherein said impact beam is an extruded aluminum alloy.

7. A bumper beam according to claim 6, wherein said base beam and said impact beam are made of different aluminum alloys.

8. A bumper beam according to claim 7, wherein the aluminum alloy of said base beam is a 7000 series aluminum alloy and the aluminum alloy of said impact beam is a 6000 series aluminum alloy.

9. A method of fabricating a bumper beam for a vehicle bumber, comprising the steps of:
   forming an upper base beam and a separate lower base beam which are to be mounted on a vehicle body as linear members;
   forming an impact beam which is to be secured to each of said base beams for absorbing an impact of a vehicle crash as a linear member;
   joining each of said base beams to said impact beam by sliding engagement in an axial direction via first and second engagement means provided respectively on said base and impact beams;
   wherein a pair of stays for mounting said base beams on said vehicle body are provided, each of said stays being provided with third engagement means; joining each of said pair of stays to each of said base beams by sliding engagement in an axial direction, whereby said third engagement means of each of said stays is slided axially with said first engagement means of said base beams in said axial direction; said first engagement means comprising projections and said second and third engagement means comprising corresponding grooves for interlocking with said projections.

10. A method of fabricating a bumper beam according to claim 9, wherein said base beams are made of a different material than said impact beam.

11. A bumper beam for a vehicle bumber, comprising:
    a base beam having a certain length and adapted to be mounted on a vehicle body with an inner surface of said base beam facing said vehicle body;
    an impact beam attached to an outer surface of said base beam for absorbing an impact in case of a vehicle crash;
    first engagement means provided on said base beam;
    second engagement means provided on said impact beam in such a manner that said impact beam may be joined with said base beam by sliding engagement of said first and second engagement means in an axial direction of said base beam; and
    a pair of stays for mounting said base beam on said vehicle body, each of said stays being provided with third engagement means adapted for sliding engagement with said first engagement means of said base beam in said axial direction; said first engagement means comprising projections and said second and third engagement means comprising corresponding grooves for interlocking with said projections, said projections interlocking with said corresponding grooves being constructed so as to be axially displaceable while preventing lateral displacement of said projections out of said grooves.

12. A bumper beam for a vehicle bumber, comprising:
    an upper base beam and a separate lower base beam each having a certain length and adapted to be mounted on a vehicle body with an inner surface of each of said base beams facing said vehicle body;
    an impact beam attached to an outer surface of each of said base beams for absorbing an impact in case of a vehicle crash;
    relative displacement restraining means for restraining relative displacement between said base beams and said impact beam, said restrain means comprising a first engagement means and a second engagement means;
    said first engagement means provided on said base beams; and
    said second engagement means provided on said impact beam for joining said impact beam with each of said base beams by sliding engagement of said first and second engagement means in an axial direction of sid base beams;
    wherein said upper base beam and said lower base beam are connected to each other via said impact beam; and
    wherein said first engagement means comprises projections on each of said upper base beam and said lower base beam and said second engagement means comprises corresponding grooves on opposite surfaces of said impact beam for engaging and interlocking with respective projections on said upper and lower base beams.

13. A bumper beam according to claim 12, wherein said base beams are made of a different material than said impact beam.

14. A method of fabricating a bumper beam for a vehicle bumper, comprising the steps of:

forming an upper base beam and a separate lower base beam which are to be mounted on a vehicle body as linear members;

forming an impact beam which is to be secured to each of said base beams for absorbing an impact of a vehicle crash as a linear member;

joining said base beams to said impact beam by sliding engagement in an axial direction via engagement means provided between said impact beam and each of said base beams such that said upper base beam and said lower base beam are connected to each other via said impact beam; and wherein said first engagement means comprises projections on each of said upper base beam and said lower base beam, and said second engagement means comprises corresponding grooves on opposite surfaces of said impact beam for engaging and interlocking with respective projections on said upper and lower base beams during said joining step.

* * * * *